United States Patent
Kamisawa

(10) Patent No.: US 7,022,424 B2
(45) Date of Patent: Apr. 4, 2006

(54) MAGNETIC RECORDING MEDIUM

(75) Inventor: Shiho Kamisawa, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/884,961

(22) Filed: Jul. 7, 2004

(65) Prior Publication Data

US 2005/0008898 A1     Jan. 13, 2005

(30) Foreign Application Priority Data

Jul. 8, 2003     (JP)     ............ P.2003-271795

(51) Int. Cl.
*G11B 5/68* (2006.01)

(52) U.S. Cl. .................. 428/840.1; 428/840.6

(58) Field of Classification Search ........ 428/694 BS, 428/141, 694 BR, 694 BU, 840.1, 840.6
See application file for complete search history.

(56) References Cited

U.S. PATENT DOCUMENTS

2002/0090535 A1\*  7/2002  Meguro et al. ....... 428/694 BS
2003/0118870 A1\*  6/2003  Noguchi et al. ...... 428/694 BH

FOREIGN PATENT DOCUMENTS

JP     2003-030814 A     1/2003
JP     2003-123222 A     4/2003

\* cited by examiner

*Primary Examiner*—Stevan A. Resan
(74) *Attorney, Agent, or Firm*—Sughrue Mion, PLLC

(57) ABSTRACT

A magnetic recording medium comprising, in this order, a nonmagnetic support, a lower layer containing nonmagnetic powder and a binder, and a magnetic layer containing ferromagnetic powder and a binder, wherein N/Fe of the magnetic layer measured with a fluorescent X-ray apparatus is from 0.5 to 1.9 wt %, and a number of concavities having a depth of 5 to 10 nm on a surface of the magnetic layer is from 20 to 100/100 $\mu m^2$.

15 Claims, No Drawings

MAGNETIC RECORDING MEDIUM

FIELD OF THE INVENTION

The present invention relates to a magnetic recording medium, in particular relates to a magnetic recording medium excellent in running durability and electromagnetic characteristics, and also excellent in formability and aging stability.

BACKGROUND OF THE INVENTION

Magnetic recording media are widely used as recording tapes, videotapes and floppy (a registered trademark) discs, and generally they take the structure comprising a magnetic layer laminated on a support. Magnetic recording media are required to be on a high level in various characteristics, e.g., electromagnetic characteristics, running durability and running performance. That is, in audiotapes for recording and reproducing music, higher reproducing capacity of original sounds is required. Moreover, videotapes are required to be excellent in electromagnetic characteristics, such as excellent in reproducing capacity of original images. Magnetic recording media are also demanded to have good running durability concurrently with excellent electromagnetic characteristics.

In recent years, with the increase of recording capacity and density, higher output and higher sensitization of a magnetic layer are increasingly required. Under such a tendency of the times, thinning of a magnetic layer has been advanced and a magnetic recording medium comprising lamination of an intermediate layer provided between a support and a magnetic layer is proposed. In particular, for the purpose of realization of good electromagnetic characteristics and running durability, a magnetic recording medium having a smooth and thin magnetic layer having high film strength is desired and, e.g., a magnetic recording medium having a magnetic layer containing a poly-urethane resin having a glass transition temperature of from 100 to 200° C. as a binder and minute spines (projections) on the surface having heights of from 10 to 20 nm restrained in number is proposed (e.g., refer to JP-A-2003-123222 (The term "JP-A" as used herein refers to an "unexamined published Japanese-patent application".)).

The state of a~magnetic layer surface is very important for recording and reproducing. A phenomenon that a signal comes out in recording and reproducing, i.e., so-called dropout (DO), caused by the adhesion of dusts on the surface of a magnetic layer, agglomerates of magnetic layer components, unevenness due to scratches on the surface of a magnetic recording medium and other defects brings about the deterioration of recording information. In particular, in a magnetic tape, e.g., a videotape, in a wound state, a magnetic layer is in contact with the back surface of the magnetic recording medium directly, so that so-called "offset", i.e., a phenomenon that the ruggedness of the back surface is impressed upon the magnetic layer, is liable to occur and problematic.

As a means for reducing the phenomenon of offset, strengthening a thinned magnetic layer and preventing the deformation by aging, a method of adding a hardening agent to a magnetic layer has so far been used (e.g., refer to JP-A-2003-30814).

SUMMARY OF THE INVENTION

However, in the above method of adding a hardening agent to a magnetic layer, the magnetic layer is generally heated for accelerating the action of the hardening agent to thereby harden the magnetic layer in a wound state (in a state of bulk) (bulk heating). Since the magnetic layer shrinks in bulk heating, the impression of the spines of the back surface on the surface of the magnetic layer caused by thermal shrinkage cannot be prevented, and so it is very difficult to get rid of the cause of DO. It is also a problem that a support deforms due to thermal shrinkage of magnetic layer, which results in the deterioration of formability.

A hardening agent is also added to a lower layer for balancing with a magnetic layer in hardness and preventing curling in the transverse direction of a tape (cupping), but there are cases where a problem of the deterioration of formability is caused by a state of hardening.

In view of the existing state of things, an object of the present invention is to provide a magnetic recording medium low in DO, having excellent electromagnetic characteristics, and excellent in running durability, formability and aging stability.

The present inventors paid attention to the compositions of a magnetic layer and a lower layer, and it was found as a result of eager investigation that a magnetic recording medium low in DO, having excellent electromagnetic characteristics, excellent in running durability, formability and aging stability could be obtained by specifying the composition of a magnetic layer to a prescribed range and controlling the concavities on the surface of a magnetic layer, which resulted in the present invention.

That is, the present invention is achieved by the following magnetic recording medium.

(1) A magnetic recording medium comprising a nonmagnetic support having provided thereon a lower layer containing nonmagnetic powder and a binder and a magnetic layer containing ferromagnetic powder and a binder in this order from the support, wherein N/Fe of the magnetic layer measured with a fluorescent X-ray apparatus is from 0.5 to 1.9 wt %, and the number of concavities 5 to 10 nm deep on the surface of the magnetic layer is from 20 to 100/100 $\mu m^2$.

Further, in the present invention, the following magnetic recording medium is preferred.

(2) The magnetic recording medium as described in the above item (1), wherein N/Fe of the lower layer measured with a fluorescent X-ray apparatus is from 0.5 to 1.2 wt %.

According to the present invention, a magnetic recording medium low in DO, having excellent electromagnetic characteristics, and excellent in running durability, formability and aging stability can be obtained.

DETAILED DESCRIPTION OF THE INVENTION

A magnetic recording medium according to the invention is described in detail below.

A magnetic recording medium according to the invention is characterized in that N/Fe of a magnetic layer measured with a fluorescent X-ray apparatus is from 0.5 to 1.9 wt %. N/Fe of a magnetic layer measured with a fluorescent X-ray apparatus shows the existing proportion of a binder and other additives having specific compositions to the ferromagnetic powder in a magnetic layer, more specifically N/Fe shows the amount of a binder and other additives containing nitrogen atoms (N) existing in a magnetic layer. A magnetic recording medium having a magnetic layer having N/Fe in the above range is small in the degree of thermal shrinkage in bulk heating, so that the offset of a back surface in bulk heating is reduced, the magnetic layer shows good surface state, and good recording and reproducing hardly generating DO can be realized. Since proper flexibility and hardness are given to the magnetic layer, running durability and formability of the magnetic recording medium are improved. N/Fe of a magnetic layer is more preferably from 1.0 to 1.9 wt %, and still more preferably from 1.6 to 1.8 wt %.

In a magnetic recording medium according to the invention, it is preferred for a lower layer to have N/Fe measured with a fluorescent X-ray apparatus of from 0.5 to 1.2 wt %, more preferably from 0.8 to 1.2 wt %, and particularly preferably from 1.0 to 1.2 wt %. When N/Fe of a lower layer is 0.5 wt % or more, the hardness of the magnetic recording medium as a whole is maintained, so that excellent aging stability can be obtained. On the other hand, making N/Fe of a lower layer 1.2 wt % or less is preferred from the point of formability of a magnetic recording medium.

In the present invention, N/Fe can be adjusted by arbitrarily selecting the binders and other additives to be added to a magnetic layer and a lower layer. For instance, N/Fe can be adjusted by properly selecting a polyurethane resin as a binder and isocyanate as a hardening agent.

A magnetic recording medium according to the invention is also characterized in that the number of concavities 5 to 10 nm deep on the surface of a magnetic layer is from 20 to $100/100 \, \mu m^2$. With the above range of the concavities 5 to 10 nm deep on the surface of a magnetic layer, DO in recording and reproducing can be reduced and good electromagnetic characteristics can be obtained. Further, friction in running also decreases, running durability can be improved as well. The number of concavities 5 to 10 nm deep on the surface of a magnetic layer is more preferably from 20 to $50/100 \, \mu m^2$.

The constituents of a magnetic recording medium in the invention, e.g., a magnetic layer, a lower layer and a support, are described in detail below.

Magnetic Layer:

<Binder>

Conventionally well-known thermoplastic resins, thermosetting resins and reactive resins can be used as binders in the magnetic layer of a magnetic recording medium according to the invention, e.g., vinyl chloride resins, vinyl chloride-vinyl acetate resins, cellulose resins, e.g., nitrocellulose, phenoxy resins and polyurethane resins are exemplified. Of these resins, polyurethane resins are preferably used for acquiring the prescribed range of N/Fe of a magnetic layer according to the invention.

Polyurethane resins for use in a magnetic layer in the invention have a glass transition temperature (Tg) of preferably from 100 to 200° C., more preferably from 140 to 180° C. The film strength of a magnetic layer increases and good running durability can be obtained with polyurethane resins having Tg of 100° C. or more, thus it is preferred from the point of preventing back surface offset. On the other hand, the dispersibility of resinss is improved by making Tg of polyurethane resins 200° C. or less, and a smooth and uniform magnetic layer can be obtained, thus excellent electromagnetic characteristics and running durability can be acquired. Further, when polyurethane resins have a high glass transition temperature, they are insusceptible to deterioration or decomposition in particular under high temperature conditions, so that a magnetic recording medium having excellent durability can be obtained.

Further, by using polyurethane resins having a high glass transition temperature, a magnetic layer having sufficiently high film strength can be obtained without using a hardening agent, e.g., isocyanate. Accordingly, it is preferred to use polyurethane resins having a high glass transition temperature also in avoiding the problems of offset and support deformation attributable to thermal shrinkage of a magnetic layer in bulk heating by the use of a hardening agent.

Urethane group concentration of polyurethane resins is preferably from 2.5 to 6.0 mmol/g, and more preferably from 3.0 to 4.5 mmol/g. When the urethane group concentration is 2.5 mmol/g or more, a film having high Tg and good durability can be obtained. While when the concentration is 6.0 mmol/g or less, solubility in a solvent is high, thus good dispersibility can be ensured. When the urethane group concentration is excessively high, the polyurethane resin cannot contain polyol inevitably, as a result the control of molecular weight is difficult, which is not preferred from the point of synthesis.

Polyurethane resins have a weight average molecular weight (Mw) of preferably from 30,000 to 200,000, and more preferably from 50,000 to 100,000. When the weight average molecular weight is 30,000 or more, high film strength and good running durability can be obtained, and when it is lower than 200,000, high solubility in a solvent and good dispersibility can be obtained.

As the polar groups of polyurethane resins, $-SO_3M$, $-OSO_3M$, $-PO_3M_2$ and $-COOM$ are preferred, and $-SO_3M$ and $-OSO_3M$ are more preferred. The content of polar groups is preferably from $1 \times 10^{-5}$ to $2 \times 10^{-4}$ eq/g. When the content of polar groups of a polyurethane resin is $1 \times 10^{-5}$ eq/g or more, the adhesion of the polyurethane resin onto ferromagnetic powder and nonmagnetic powder is heightened and good dispersibility can be obtained. While when the content is $2 \times 10^{-4}$ eq/g or less, high solubility in a solvent and good dispersibility can be secured.

Well-known polyols can be used in the present invention as the polyol components of polyurethane resins, e.g., polyester polyol, polyether polyol, polycarbonate polyol, polyether ester polyol, polyolefin polyol, and diol compounds having a cyclic structure and a long alkyl chain, such as dimer diol, can be used.

The diol components are preferably diol compounds having a cyclic structure and a long alkyl chain. A long alkyl chain here means an alkyl group having from 2 to 18 carbon atoms. When a compound has a cyclic structure and a long alkyl chain, the compound comes to have a folded structure, and so the solubility in a solvent becomes excellent. As a result, the molecular chain of urethane adsorbed onto the surface of magnetic powder or nonmagnetic powder in a coating solution can be broadened, thereby dispersion stability can be improved and excellent electromagnetic characteristics can be obtained. In addition, polyurethane having a high glass transition temperature can be obtained for having the cyclic structure.

Diol compounds having a cyclic structure and a long alkyl chain are particularly preferably represented by the following formulae:

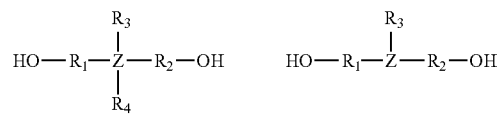

In the formulae, Z represents a cyclic structure selected from a cyclohexane ring, a benzene ring and a naphthalene ring; $R_1$ and $R_2$ each represents an alkylene group having from 1 to 18 carbon atoms; and $R_3$ and $R_4$ each represents an alkyl group having from 2 to 18 carbon atoms.

The above diol components are preferably contained in polyurethane resins in an amount of from 10 to 50 wt %, and more preferably from 15 to 40 wt %. When the content of the diol components is 10 wt % or more, solubility in a solvent is high and good dispersibility can be obtained, and when the content is 50 wt % or less, a film having high Tg and excellent durability can be obtained.

As the binder of a magnetic layer, vinyl chloride synthetic resins may be used in combination with polyurethane resins. The vinyl chloride resins that can be used in combination have the polymerization degree of preferably from 200 to 600, and particularly preferably from 250 to 450. Vinyl chloride resins may be copolymers of vinyl monomers, e.g., vinyl acetate, vinyl alcohol, vinylidene chloride or acrylonitrile.

Polyurethane resin may be used in combination with various synthetic resins besides these vinyl chloride resins. As such usable synthetic resins, e.g., ethylene-vinyl acetate copolymers, cellulose derivatives, e.g., nitrocellulose resins, acrylic resins, polyvinyl acetal resins, polyvinyl butyral resins, epoxy resins and phenoxy resins are exemplified. These synthetic resins may be used alone or in combination.

When other synthetic resins are used in combination with polyurethane resin, the polyurethane resin contained in the magnetic layer is preferably contained in the binder in an amount of from 10 to 90 wt %, more preferably from 20 to 80 wt %, and particularly preferably from 25 to 60 wt %. The amount of the vinyl chloride resins contained in the binder is preferably from 10 to 80 wt %, more preferably from 20 to 70 wt %, and particularly preferably from 30 to 60 wt %.

<Number of Concavities on the Surface of Magnetic Layer>

A magnetic layer that is the outermost layer of the magnetic recording medium of the invention has from 20 to 100/100 $\mu m^2$ of concavities 5 to 10 nm deep on the surface. When the number of concavities 5 to 10 nm deep on the surface of a magnetic layer is less than 20/100 $\mu m^2$, the friction coefficient during running becomes high and running durability lowers, while when the concavities are more than 100/100 $\mu m^2$, electromagnetic characteristics decrease.

When surface concavities exceeding 10 nm are abundant, the spacing loss between the surface of a magnetic layer and a head becomes broad, so that electromagnetic characteristics decrease. Accordingly, concavities exceeding 10 nm on the surface of the outermost magnetic layer are preferably few. For further elevating electromagnetic characteristics, surface concavities smaller than 10 nm are also preferably few.

Surface concavities of a magnetic layer can be controlled by the particle sizes of inorganic powders, e.g., magnetic powder, an abrasive and a carbon black added to the outermost layer, magnetic powder, nonmagnetic powder, an abrasive and a carbon black added to the lower layer of the outermost layer, the kinds of the binders and lubricants to disperse these inorganic powders, the blending conditions and dispersing conditions in preparing a magnetic layer coating solution and a lower layer coating solution, the thickness of coating layers, drying conditions and calendering conditions.

Specifically, as the blending condition, the concentration of the solids content to be blended in preparing the coating solution of the lower layer of the outermost layer is preferably from 65 to 85 wt %. When the concentration is in the above range, the dispersibility of the solids content of the lower layer is good, so that the minute spines of the surface of the uppermost layer generated by dispersion failure of the lower layer are few and the outermost layer having high smoothness can be obtained.

Dispersion is performed with a disperser, e.g., a ball mill, a sand grinder and an attritor, and it is preferred to increase dispersion shear by raising the viscosity of a coating solution (the concentration of solids content) in a dispersible range. The dispersibility of the coating solution can be improved by increasing dispersion shear.

As the calendering treatment conditions, the roll temperature is from 60 to 100° C., preferably from 70 to 90° C., the linear pressure is from 980 to 4,900 N/cm, preferably from 1,960 to 4,412 N/cm. A film excellent in surface smoothness can be obtained under the above conditions of calendering treatment. Heat resistive plastic rolls, e.g., epoxy, polyimide, polyamide and polyamideimide are used in the treatment, and metal rolls are preferably used.

As described above, there are various methods to control the number of concavities of the outermost magnetic layer surface, and these methods can be used in arbitrary combination for obtaining the surface state as defined in a magnetic recording medium according to the present invention.

Further, in the present invention, as described above, the offset of back surface can be reduced by bringing N/Fe of a magnetic layer into the prescribed range, and the prevention of the surface unevenness of a magnetic layer by the offset of back surface is one factor to make it easy to control the number of concavities of the surface of a magnetic layer.

The number of concavities of the surface of a magnetic recording medium in the invention having heights of from 5 to 10 nm in 10 μm square (100 $\mu m^2$) was measured with an SiN probe of a quadrangular pyramid of a sharpness of 70° by Nanoscope III (AFM: atomic force microscope) manufactured by Digital Instruments Corp.

<Ferromagnetic Powder>

Ferromagnetic powders for use in a magnetic recording medium in the present invention include cobalt-containing ferromagnetic iron oxides and ferromagnetic alloy powders. Ferromagnetic powders preferably have a specific surface area ($S_{BET}$) by a BET method of from 40 to 80 $m^2/g$, more preferably from 50 to 70 $m^2/g$. Ferromagnetic powders have a crystallite size of from 12 to 25 nm, preferably from 13 to 22 nm, and particularly preferably from 14 to 20 nm. The long axis length of ferromagnetic powders is preferably from 0.05 to 0.25 μm, more preferably from 0.07 to 0.2 μm, and particularly preferably from 0.08 to 0.15 μm.

As ferromagnetic powders, Fe, Fe—Co, Fe—Ni and Co—Ni—Fe each containing yttrium are specifically exemplified. The yttrium content in ferromagnetic powders is preferably from 0.5 to 20 atomic %, more preferably from 5 to 10 atomic %, in the atomic ratio of the yttrium atom to the iron atom, Y/Fe. When the yttrium content is 0.5 atomic % or more, $\sigma_s$ of the ferromagnetic powder is heightened, magnetic characteristics are improved and good electromagnetic characteristics can be obtained. While when the yttrium content is 20 atomic % or less, the iron content becomes proper and magnetic characteristics and electromagnetic characteristics are improved. Further, ferromagnetic metal powders can contain aluminum, silicon, sulfur, scandium, titanium, vanadium, chromium, manganese, copper, zinc, molybdenum, rhodium, palladium, tin, antimony, boron, barium, tantalum, tungsten, rhenium, gold, lead, phosphorus, lanthanum, cerium, praseodymium, neodymium, tellurium or bismuth in the range of 20 atomic % or less to 100 atomic % of the iron. In addition, ferromagnetic powders may contain a small amount of water, hydroxide or oxide.

As an example of manufacturing methods of ferromagnetic powder in the invention to which cobalt and yttrium are introduced, a method of using, as a starting material, iron oxyhydroxide obtained by blowing oxidizing gas to an aqueous suspension comprising the mixture of ferrous salt and alkali can be exemplified. As the kind of the iron oxyhydroxide, α-FeOOH is preferred. As the manufacturing method of α-FeOOH, there are a first method of neutralizing ferrous salt with alkali hydroxide to make an aqueous suspension of $Fe(OH)_2$, and blowing oxidizing gas to the suspension to thereby obtain acicular α-FeOOH, and a second method of neutralizing ferrous salt with alkali carbonate to make an aqueous suspension of $FeCO_3$, and blowing oxidizing gas to the suspension to thereby obtain spindle-like α-FeOOH. These iron oxyhydroxides are preferably those obtained by reacting an aqueous solution of ferrous salt with an alkali aqueous solution to thereby obtain an aqueous solution containing ferrous hydroxide, and then oxidizing the solution by air oxidation and the like. At this time, a salt of alkaline earth elements, e.g., Ni salts, Ca salts, Ba salts or Sr salts, or Cr salts or Zn salts may be coexistent with the ferrous salt aqueous solution. The configurations of the particles of ferromagnetic powders (e.g., axial ratio) can be adjusted by arbitrarily selecting these salts.

As the ferrous salts, ferrous chloride and ferrous sulfate are preferably used. As the alkalis, sodium hydroxide, aqueous ammonia, ammonium carbonate and sodium carbonate are preferably used. As the salts that can be coexistent with the ferrous salts, chlorides, e.g., nickel chloride, calcium chloride, barium chloride, strontium chloride, chromium chloride and zinc chloride are preferably used. In the case where cobalt is introduced into the iron, an aqueous solution of cobalt compound, e.g., cobalt sulfate or cobalt chloride is mixed with the slurry of the iron oxyhydroxide with stirring before introducing yttrium. After preparing the slurry of cobalt-containing iron oxyhydroxide, an aqueous solution containing an yttrium compound is added to the slurry and mixed with stirring, thereby cobalt can be introduced.

Neodymium, samarium, praseodymium and lanthanum can also e introduced into the ferromagnetic powder of the present invention besides yttrium. These elements can be introduced into the ferromagnetic powder by using chlorides, e.g., yttrium chloride, neodymium chloride, samarium chloride, praseodymium chloride and lanthanum chloride, and nitrates, e.g., neodymium nitrate and gadolinium nitrate, and these elements may be used in combination of two or more. The configurations of the ferromagnetic powders are not especially restricted but acicular, granular, die-like, ellipsoidal and tabular configurations are generally used. It is particularly preferred to use acicular ferromagnetic powders.

<Additives and Others>

The magnetic layer of a magnetic recording medium in the invention may contain, if necessary, ordinarily used additives and fillers, such as a hardening agent, an abrasive, e.g., α-$Al_2O_3$ and $Cr_2O_3$, an antistatic agent, e.g., carbon black, a lubricant, e.g., fatty acid, fatty acid ester and silicone oil, a dispersant, an antifungal agent, an antioxidant and a solvent in addition to the above binders and ferromagnetic powders.

In a magnetic recording medium in the invention, a magnetic layer may take a multilayer structure. In that case, as magnetic powder in a lower magnetic layer, γ-$Fe_2O_3$, Co-modified γ-$Fe_2O_3$, alloys comprising α-Fe as a main component, and $CrO_2$ can be used. Co-modified γ-$Fe_2O_3$ is particularly preferred. It is preferred for the ferromagnetic powder for use in a lower magnetic layer to have the same composition and performances as those used in the uppermost magnetic layer. However, performance may be varied in upper and lower layers according to purpose as is well known. For example, for improving long wavelength recording characteristics, it is preferred to set Hc of a lower magnetic layer lower than that of the uppermost magnetic layer, and it is also effective to make Br of a lower magnetic layer higher than that of the uppermost magnetic layer. In addition, the advantages of well-known multilayer constitutions can be utilized.

Lower Layer:

Nonmagnetic powder contained in a lower layer can be selected from inorganic compounds, e.g., metallic oxide, metallic carbonate, metallic sulfate, metallic nitride, metallic carbide and metallic sulfide. The examples of inorganic compounds are selected from the following compounds and they can be used alone or in combination, e.g., α-alumina having an α-conversion rate of from 90 to 100%, β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, and molybdenum disulfide. Of these compounds, titanium dioxide, zinc oxide, iron oxide and barium sulfate are particularly preferred, and titanium dioxide is more preferred. These nonmagnetic powders preferably have an average particle size of from 0.005 to 2 μm. A plurality of nonmagnetic powders each having a different average particle size may be combined, if necessary, or a single nonmagnetic powder having a broad particle size distribution may be used so as to attain the same effect as such a combination. A particularly preferred average particle size of nonmagnetic powders is from 0.01 to 0.2 μm. Nonmagnetic powders for use in the invention have a pH value of generally from 6 to 9, a specific surface area of preferably from 1 to 100 $m^2$/g, more preferably from 5 to 50 $m^2$/g, and still more preferably from 7 to 40 $m^2$/g, a crystallite size of preferably from 0.01 to 2 μm, an oil absorption amount using DBP of generally from 5 to 100 ml/100 g, preferably from 10 to 80 ml/100 g, and more preferably from 20 to 60 ml/100 g, and a specific gravity of generally from 1 to 12, and preferably from 3 to 6. The configuration of nonmagnetic powders may be any of acicular, spherical, polyhedral and tabular configurations.

It is preferred that the surfaces of these nonmagnetic powders be covered with $Al_2O_3$, $SiO_2$, $TiO_2$, $ZrO_2$, $SnO_2$, $Sb_2O_3$ or ZnO. $Al_2O_3$, $SiO_2$, $TiO_2$ and $ZrO_2$ are particularly preferred, and $Al_2O_3$, $SiO_2$ and $ZrO_2$ are more preferred. These surface-covering compounds may be used in combination or they may be used alone. Surface treatment may be performed by coprecipitation, alternatively surface treatment of powders may be performed in such a manner that particle surfaces are covered with alumina in the first place, and then the alumina-covered particles are covered with silica, or vice versa, according to purposes. A surface-covered layer may be porous, if necessary, but a homogeneous and dense layer is generally preferred.

By incorporating carbon blacks into a lower layer, Rs can be reduced, which is a well-known effect, and a desired micro Vickers hardness can be obtained. Furnace blacks for rubbers, thermal blacks for rubbers, carbon blacks for coloring and acetylene blacks can be used for these purposes. Carbon blacks for use in a lower layer have a specific surface area of generally from 100 to 500 $m^2/g$, preferably from 150 to 400 $m^2/g$, a DBP oil absorption amount of generally from 20 to 400 ml/100 g, preferably from 30 to 400 ml/100 g, and an average particle size of generally from 5 to 80 nm (mμ), preferably from 10 to 50 nm (mμ), and more preferably from 10 to 40 nm (mμ). Carbon blacks preferably have pH of from 2 to 10, a moisture content of from 0.1 to 10%, and a tap density of from 0.1 to 1 g/ml. The specific examples of carbon blacks for use in the invention include BLACK-PEARLS 2000, 1300, 1000, 900, 800, 880 and 700, and VULCAN XC-72 (manufactured by Cabot Co., Ltd.), #3050B, #3150B, #3250B, #3750B, #3950B, #950, #650B, #970B, #850B, and MA-600 (manufactured by Mitsubishi Kasei Corp.), CONDUCTEX SC, RAVEN 8800, 8000, 7000, 5750, 5250, 3500, 2100, 2000, 1800, 1500, 1255 and 1250 (manufactured by Columbia Carbon Co., Ltd.), and Ketjen Black EC (manufactured by Akzo Co., Ltd.).

These carbon blacks may be added to a magnetic layer.

The binders, lubricants, dispersants, additives, solvents, dispersing methods and others used in a magnetic layer can be used in a nonmagnetic layer. In particular, with respect to the amounts and the kinds of binders, additives, the amounts and the kinds of dispersants, well-known techniques used in a magnetic layer can be applied to a nonmagnetic layer.

As the binder in a nonmagnetic lower layer, polyurethane resins are particularly preferably used for capable of increasing the film strength. It is also preferred to add a hardening agent to a nonmagnetic layer for the purpose of increasing the film strength of the nonmagnetic layer and at the same time adjusting the strength of the magnetic recording medium as a whole.

The content of OH groups in the polyurethane resin for use as the binder of a lower layer is preferably from 2 to 20 per a molecule, and more preferably from 3 to 15 per a molecule. When 2 or more OH groups are contained per a molecule, the polyurethane resin well reacts with isocyanate to be used as the hardening agent, so that high film strength and good durability can be obtained. On the other hand, when the polyurethane resin contains 15 or less OH groups per a molecule, solubility in a solvent becomes high and good dispersibility can be secured. For introducing OH groups, compounds having trifunctional or higher OH groups, e.g., trimethylolethane, trimethylolpropane, trimellitic anhydride, glycerol, pentaerythritol or hexanetriol, branched polyester or polyether ester having trifunctional or higher OH groups can be used. Trifunctional OH groups are preferred of these compounds. When tetrafunctional or higher groups are used, the reaction with a hardening agent is expedited and the pot life becomes short.

Well-known polyols can be used in the invention as the polyol component of the polyurethane resins. The molecular weight of polyols is preferably from 500 to 2,000 or so. When the molecular weight is in the above range, it is possible to substantially increase the weight ratio of diisocyanate, as a result urethane bonds increase and the intermolecular interaction is heightened, so that a film having a high glass transition temperature and high dynamic strength can be obtained.

The above diol components are preferably contained in the polyurethane resin in a proportion of from 10 to 50 wt %, and more preferably from 15 to 40 wt %. When the content of the diol components is 10 wt % or more, solubility in a solvent is high and good dispersibility can be obtained, and when the content is 50 wt % or less, a film having high Tg and excellent durability can be obtained.

The polyurethane resin in a lower layer can contain a diol component other than the above diol components as a chain extender. When the molecular weight of the diol components becomes great, the content of diisocyanate inevitably becomes small, so that the urethane bonds in the polyurethane lessen and the film strength deteriorates. Consequently, for obtaining satisfactory film strength, chain extenders to be used in combination with the polyurethane resin are preferably low molecular weight diols having a molecular weight of less than 500, preferably 300 or less.

As the diisocyanates for use in the polyurethane resin for use in a lower layer, well-known diisocyanates, e.g., TDI (tolylene diisocyanate), MDI (diphenylmethane diisocyanate), p-phenylene diisocyanate, o-phenylene diisocyanate, m-phenylene diisocyanate, xylylene diisocyanate, xylylene diisocyanate hydride, and isophorone diisocyanate are preferably used.

Hardening agent, e.g., polyisocyanate compounds, can be used with the binder in the present invention. As the examples of polyisocyanate compounds, the reaction products of 3 mols of tolylene diisocyanate and 1 mol of trimethylolpropane (e.g., Desmodur L-75, manufactured by Bayer Yakuhin Ltd.), the reaction products of 3 mols of diisocyanate, e.g., xylylene diisocyanate or hexamethylene diisocyanate and 1 mol of trimethylolpropane, biuret addition compounds with 3 mols of hexamethylene diisocyanate, isocyanurate compounds of 5 mols of tolylene diisocyanate, isocyanurate addition compounds of 3 mols of tolylene diisocyanate and 2 mols of hexamethylene diisocyanate, and polymers of isophorone diisocyanate and diphenylmethane diisocyanate can be exemplified.

The polyisocyanate compounds contained in a lower layer is preferably contained in the binder from 10 to 50 wt %, and more preferably from 20 to 40 wt %. When hardening treatment by electron beam irradiation is performed, compounds having a reactive double bond, e.g., urethane acrylate, can be used. The total weight of the resin components and the hardening agent (i.e., the weight of the binder) is generally preferably from 15 to 40 weight parts per 100 weight parts of the ferromagnetic powder, and more preferably from 20 to 30 weight parts.

Nonmagnetic Support:

As nonmagnetic supports, biaxially stretched polyethylene naphthalate, polyethylene terephthalate, polyamide, polyimide, polyamideimide, aromatic polyamide and polybenzoxazole can be used in the invention. Polyethylene naphthalate and aromatic polyamide are preferably used. These nonmagnetic supports may be subjected to surface treatment in advance, e.g., corona discharge treatment, plasma treatment, adhesion assisting treatment and heat treatment. Nonmagnetic supports that can be used in the present invention have a centerline average surface roughness of from 0.1 to 20 nm at a cut-off value of 0.25 mm, preferably from 1 to 10 nm, and preferably have excellent surface smoothness. It is also preferred that these nonmagnetic supports not only have a small centerline average surface roughness but are free from coarse spines of 1 μm or greater.

Layer Constitution:

A magnetic recording medium in the invention takes multilayer structure comprising a nonmagnetic support having provided thereon a lower layer and at least one magnetic layer. The thickness of the magnetic layer is preferably from 0.05 to 1.0 μm, more preferably from 0.1 to 0.5 μm or more. When the thickness of the magnetic layer is 0.05 μm or more, coating unevenness is not generated and uniform coating of the magnetic layer can be secured. When the thickness is 1.0 µm or less, excellent durability can be obtained. The thickness of the lower layer is preferably from 1.0 to 2.0 µm, and more preferably from 1.2 to 1.5 µm.

Manufacturing Method of Magnetic Recording Medium:

A magnetic recording medium in the invention can be manufactured by coating a lower layer coating solution on the surface of a nonmagnetic support under traveling, and coating a magnetic layer coating solution after drying the lower layer coating solution or simultaneously with the lower layer coating solution in the above ranges of dry thickness of the lower layer and magnetic layer.

The coating solution of each layer can be prepared by blending and dispersing a binder, ferromagnetic powder or nonmagnetic powder and other additives with a solvent, e.g., methyl ethyl ketone, dioxane, cyclohexanone, or ethyl acetate by ordinary methods.

Air doctor coating, blade coating, rod coating, extrusion coating, air knife coating, squeeze coating, impregnation coating, reverse roll coating, transfer roll coating, gravure coating, kiss coating, cast coating, spray coating and spin coating can be used for coating the above magnetic layer coating solution. Regarding these methods, e.g., *Saishin Coating Gijutsu* (*The Latest Coating Techniques*), Sogo Gijutsu Center (May 31, 1983) can be referred to.

The following apparatus and methods are used in the invention for coating a magnetic recording medium.

(1) A method of coating a lower layer in the first place by using any of gravure coating, roll coating, blade coating and extrusion coating apparatus, which are ordinarily used in the coating of a magnetic coating solution, and then coating an upper layer while the lower layer is still wet by means of a support-pressing type extrusion coating apparatus as disclosed in JP-B-1-46186 (the term "JP-B" as used herein means an "examined Japanese patent publication"), JP-A-60-238179 and JP-A-2-265672.

(2) A method of coating an upper layer and a lower layer almost simultaneously by using a coating head equipped with two slits for feeding coating solutions as disclosed in JP-A-63-88080, JP-A-2-17971 and JP-A-2-265672.

(3) A method of coating an upper layer and a lower layer almost simultaneously by using an extrusion coating apparatus equipped with a backup roll as disclosed in JP-A-2-174965.

A backing layer maybe provided on the side of a nonmagnetic support for use in the invention on which a magnetic coating solution is not coated. The backing layer is in general a layer provided on the side of a nonmagnetic support on which a magnetic coating solution is not coated by coating a backing layer-forming coating solution comprising an organic solvent having dispersed therein granular components, e.g., an abrasive and an antistatic agent, and a binder. Further, an adhesive layer may be provided on the side of a nonmagnetic support on which a magnetic coating solution and a backing layer-forming coating solution are coated.

The coated layer of the magnetic coating solution is dried after the ferromagnetic powder contained in the coated layer f the magnetic coating solution was subjected to magnetic field orientation treatment.

It is preferred for the thus-dried layer to be subjected to surface smoothing treatment. For the surface smoothing treatment, e.g., super-calender rolls are used. Since the voids generated, e.g., the removal of the solvent by drying vanish by performing smoothing treatment and the packing rate of the ferromagnetic powder contained in the magnetic layer increases, a magnetic recording medium having high electromagnetic characteristics can be obtained. As the calender rolls, heat resistive plastic rolls, e.g., epoxy, polyimide, polyamide and polyamideimide, and metal rolls are used. It is preferred to use metal rolls.

It is preferred for a magnetic recording medium in the invention to have a magnetic layer surface having extremely excellent smoothness such as a centerline average surface roughness of from 0.1 to 4 nm at a cut-off value of 0.25 mm, preferably from 1 to 3 nm. Such a hyper smooth surface can be obtained by subjecting a magnetic layer formed by selecting specific ferromagnetic powder and a binder as described above to calendering treatment. The obtained magnetic recording medium is cut to a desired size with a cutter and the like and used.

EXAMPLES

The present invention is described in further detail below with reference to EXAMPLES and COMPARATIVE EXAMPLES. "Parts" in the following means "parts by weight".

Example 1

Upper Layer (Magnetic Layer) Coating Solution:

Ferromagnetic alloy powder (100 parts) (composition: Fe 89 atm %, Co 5 atm %, Y 6 atm %, coercive force (Hc): 159 kA/m (2,000 Oe), crystallite size: 15 nm, specific surface area ($S_{BET}$): 59 m$^2$/g, long axis length: 0.12 µm, acicular ratio: 7, $\sigma_s$: 150 A·m$^2$/kg (150 emu/g)) was pulverized in an open kneader for 10 minutes.

Subsequently, 25 parts of polar group (an —SO$_3$Na group)-containing dimer diol series polyurethane resin (Tg: 160° C., —SO$_3$Na group content: $6\times10^{-5}$ eq/g) was added to the above pulverized ferromagnetic alloy powder, and 30 parts of cyclohexanone was further added thereto and the mixture was kneaded for 60 minutes.

In the next place,

| | |
|---|---|
| Abrasive (Al$_2$O$_3$, particle size: 0.3 µm) | 2 parts |
| Carbon black (particle size: 40 µm) | 2 parts |
| Methyl ethyl ketone/toluene (1/1) | 200 parts | were added to the above reaction mixture and dispersed in a sand mill for 120 minutes, and further,

| | |
|---|---|
| Butyl stearate | 2 parts |
| Stearic acid | 1 part |
| Methyl ethyl ketone | 50 parts | were added, followed by stirring and blending for further 20 minutes, and the reaction solution was filtered through a filter having an average pore diameter of 1 µm, thereby a magnetic coating solution was prepared.

Lower Layer Coating Solution:

α-Fe$_2$O$_3$ (100 parts) (average particle size: 0.15 µm, $S_{BET}$: 52 m$^2$/g, surface-treated with Al$_2$O$_3$ and SiO$_2$, pH: 6.5 to 8.0) was pulverized in an open kneader for 10 minutes. In the next place, 7.5 parts of a compound (SO$_3$Na: $6\times10^{-5}$ eq/g, epoxy: $10^{-3}$ eq/g, Mw: 30,000) obtained by adding sodium hydroxyethyl sulfonate to a copolymer comprising vinyl chloride/vinyl acetate/glycidyl methacrylate in proportion of 86/9/5, 5 parts of polyurethane (UR-8300, manufactured by Toyobo Co., Ltd.), and 30 parts of cyclohexanone were added to the above pulverized $\alpha$-$Fe_2O_3$ and kneaded for 60 minutes.

Subsequently,

| | |
|---|---|
| Methyl ethyl ketone/cyclohexanone (6/4) | 200 parts | was added to the above reaction mixture and dispersed in a sand mill for 120 minutes.

To the above dispersion were added

| | |
|---|---|
| Polyisocyanate (Coronate 3041, manufactured by Nippon Polyurethane Industries Co., Ltd.) | 5 parts (solid content) |
| Butyl stearate | 2 parts |
| Stearic acid | 1 part |
| Methyl ethyl ketone | 50 parts | followed by stirring and blending for further 20 minutes, and the mixture was filtered through a filter having an average pore diameter of 1 μm, thereby a lower coating solution was prepared.

A sulfonic acid-containing polyester resin was coated in a dry thickness of 0.1 μm on the surface of a nonmagnetic aramid support having a thickness of 4 μm with a coil bar, thereby an abrasive layer was formed. Subsequently, the lower coating solution was coated thereon in a dry thickness of 1.5 μm, and just after that the magnetic layer coating solution was simultaneously multilayer-coated on the lower layer in a dry thickness of 0.05 μm using a reverse roll. While the magnetic coating solution was still wet, the nonmagnetic support was subjected to magnetic field orientation with a 0.5 T (5,000 gauss) Co magnet and a 0.4 T (4,000 gauss) solenoid magnet. After drying, the coated sample underwent calendering treatment through a calender of seven stages consisting of metal rolls lone at a velocity of 100 m/min., linear pressure of 2,942 N/cm and a temperature of 90° C. After that, the web was slit to 3.8 mm wide, wound up, preserved at 50° C. under dry atmosphere for 24 hours, and subjected to bulk thermo treatment to thereby obtain a magnetic recording medium (a tape).

Examples 2 and 3

Each tape sample was prepared in the same manner as in Example 1 except for changing the amount of polyurethane (UP) in the upper layer coating solution and the ratio of the amount of polyurethane (UP) and polyisocyanate (L) in the lower layer coating solution as shown in Table 1 below.

Comparative Examples 1 to 3

Each tape sample was prepared in the same manner as in Example 1 except that polyurethane (UR-8300, manufactured by Toyobo Co., Ltd.) and polyisocyanate (Coronate 3041, manufactured by Nippon Polyurethane Industries Co., Ltd.) were added to the upper layer solution in the ratio of polyurethane and polyisocyanate as shown in Table 1 in place of dimer diol series polyurethane resin.

N/Fe of each of the magnetic layers of tape samples shown in Examples and Comparative Examples was measured by using fluorescent X-ray apparatus XRF-1700 (manufactured by Shimadzu Corporation) with Rh X ray tube, at voltage of 40 kV and electric current of 95 mA. In the first place, a magnetic layer was peeled from a sample to make the sample with only a lower layer, quantitative analysis of the lower layer was performed by measuring the sample, and the composition of the total weight of the lower layer was determined. In the next place, a sample having a magnetic layer was measured, and the composition of the total weight of the lower layer and the magnetic layer was determined. The composition of the total weight of the magnetic layer was determined from the data of the composition of the total weight of the lower layer and the magnetic layer and the data of the composition of the lower layer, from which N/Fe of the magnetic layer was found.

The number of concavities of the surface of a magnetic layer having heights of from 5 to 10 nm in 10 μm square (100 μm$^2$) was measured with an SiN probe of a quadrangular pyramid of a sharpness of 70° by Nanoscope III (AFM: atomic force microscope, manufactured by Digital Instruments Corp.).

Evaluation:

With the sample tapes in Examples and Comparative Examples, surface roughness (Ra) of each magnetic layer surface was evaluated by the measurement with a light interference type surface roughness meter. The evaluation of DO was performed as follows, and the results of evaluation are shown in Table 1 below.

Evaluation of DO:

Signals of frequency of 9 MHz were wrote with DDS drive at an optimal electric current value, and the reproduced signals were counted with a dropout counter (manufactured by Shiba Soku Co., Ltd.). Measurement was performed for 5 minutes, and the average number per 1 minute of DO of 15 μsec/−10 dB was found.

TABLE 1

| | Ex. 1 | Ex. 2 | Ex. 3 | Comp. Ex. 1 | Comp. Ex. 2 | Comp. Ex. 3 |
|---|---|---|---|---|---|---|
| Upper Layer N/Fe (wt %) | 1.5 | 1.8 | 1.2 | 2.34 | 2.8 | 2.33 |
| Lower Layer N/Fe (wt %) | 0.5 | 1.2 | 0.9 | 0.76 | 1.45 | 1.83 |
| Number of concavities of magnetic layer (number/100 μm$^2$) | 80 | 30 | 98 | 500 | 1,000 | 200 |
| Surface roughness of magnetic layer (Ra) (nm) | 2.6 | 3.78 | 1.8 | 4.76 | 4.76 | 4.9 |
| Number of DO of magnetic layer surface (number) | 18 | 15 | 25 | 45 | 50 | 65 |

TABLE 1-continued

|  | Ex. 1 | Ex. 2 | Ex. 3 | Comp. Ex. 1 | Comp. Ex. 2 | Comp. Ex. 3 |
|---|---|---|---|---|---|---|
| Upper layer, L/(PU + L) (ratio by weight part) | 0/25 | 0/9 | 0/19 | 5/18 | 8/16.5 | 7.5/15.5 |
| Lower layer, L/(PU + L) (ratio by weight part) | 5/10 | 6/12 | 6/10 | 6.5/12.5 | 5.7/12.1 | 5.7/12.1 |

As a result of evaluation of the formability and aging stability of each tape sample in addition to the results shown in Table 1, the following facts were revealed.

In samples of Examples 1 to 3 in which N/Fe of the upper magnetic layer was from 0.5 to 1.9 wt % and the number of concavities 5 to 10 nm deep on the surface of the magnetic layer was from 20 to 100/100 µm², the surface roughness of the magnetic layer was small, electromagnetic characteristics were excellent such as few DO, and running durability was satisfactory. Formability and aging stability of each tape were also good.

On the other hand, in Comparative Examples 1 to 3 in which N/Fe of the upper magnetic layer deviated from the range of from 0.5 to 1.9 wt % and the number of concavities on the surface of the magnetic layer was more than the range specified in the invention, the surface roughness of the magnetic layer was coarse, as a result, DO was frequent and running durability was inferior to that of the samples in Examples 1 to 3. The formability of tapes was also not good. In Comparative Example 3 wherein N/Fe of the lower layer exceeded the range of from 0.5 to 1.5 wt %, the tape at large was hard and the formability was extremely inferior.

This application is based on Japanese Patent application JP 2003-271795, filed Jul. 8, 2003, the entire content of which is hereby incorporated by reference, the same as if set forth at length.

What is claimed is:

1. A magnetic recording medium comprising, in this order, a nonmagnetic support, a lower layer containing nonmagnetic powder and a binder, and a magnetic layer containing ferromagnetic powder and a binder, the magnetic layer contains N and Fe in an N/Fe ratio of from 0.5 to 1.9 wt % when measured with a fluorescent X-ray apparatus, and a number of concavities having a depth of 5 to 10 nm on a surface of the magnetic layer is from 20 to 100/100 µm².

2. The magnetic recording medium according to claim 1, wherein the N/Fe ratio of the magnetic layer measured with a fluorescent X-ray apparatus is from 1.0 to 1.9 wt %.

3. The magnetic recording medium according to claim 1, wherein the N/Fe ratio of the magnetic layer measured with a fluorescent X-ray apparatus is from 1.6 to 1.8 wt %.

4. The magnetic recording medium according to claim 1, wherein the lower layer contains N and Fe in a N/Fe ratio of from 0.5 to 1.2 wt % when measured with a fluorescent X-ray apparatus.

5. The magnetic recording medium according to claim 1, wherein the lower layer contains N and Fe in a N/Fe ratio of from 0.8 to 1.2 wt % when measured with a fluorescent X-ray apparatus.

6. The magnetic recording medium according to claim 1, wherein the lower layer contains N and Fe in a N/Fe ratio of from 1.0 to 1.2 wt % when measured with a fluorescent X-ray apparatus.

7. The magnetic recording medium according to claim 1, wherein the number of concavities having a depth of 5 to 10 nm on a surface of the magnetic layer is from 20 to 50/100 µm².

8. The magnetic recording medium according to claim 1, wherein the binder contained in the magnetic layer is a polyurethane resin.

9. The magnetic recording medium according to claim 8, wherein the polyurethane resin contained in the magnetic layer has a glass transition temperature of from 100 to 200° C.

10. The magnetic recording medium according to claim 8, wherein the polyurethane resin contained in the magnetic layer has a glass transition temperature of from 140 to 180° C.

11. The magnetic recording medium according to claim 8, wherein the polyurethane resin contained in the magnetic layer has a urethane group concentration of from 2.5 to 6.0 mmol/g.

12. The magnetic recording medium according to claim 9, wherein the polyurethane resin contained in the magnetic layer has a urethane group concentration of from 3.0 to 4.5 mmol/g.

13. The magnetic recording medium according to claim 1, wherein the binder contained in the lower layer is a polyurethane resin.

14. The magnetic recording medium according to claim 1, wherein the lower layer further contains a polyisocyanate compound.

15. The magnetic recording medium according to claim 1, wherein the lower layer further contains carbon black.

* * * * *